(12) United States Patent
Nandakumar et al.

(10) Patent No.: US 11,115,697 B1
(45) Date of Patent: Sep. 7, 2021

(54) RESOLUTION-BASED MANIFEST GENERATOR FOR ADAPTIVE BITRATE VIDEO STREAMING

(71) Applicant: Amazon Technologies, Inc., Seattle, WA (US)

(72) Inventors: Deepthi Nandakumar, Bengaluru (IN); Brian Manuel Alvarez, Seattle, WA (US); Daniel Robert Graham, Seattle, WA (US); Avisar Ten-Ami, Bothell, WA (US); Lei Li, Yarrow Point, WA (US)

(73) Assignee: Amazon Technologies, Inc., Seattle, WA (US)

( * ) Notice: Subject to any disclaimer, the term of this patent is extended or adjusted under 35 U.S.C. 154(b) by 5 days.

(21) Appl. No.: 16/705,952

(22) Filed: Dec. 6, 2019

(51) Int. Cl.
*H04N 21/2662* (2011.01)
*H04L 29/06* (2006.01)
*H04N 21/2343* (2011.01)
*H04L 12/24* (2006.01)
(Continued)

(52) U.S. Cl.
CPC ....... *H04N 21/2662* (2013.01); *H04L 41/509* (2013.01); *H04L 65/601* (2013.01); *H04L 65/607* (2013.01); *H04L 65/80* (2013.01); *H04N 21/23439* (2013.01); *H04N 21/234363* (2013.01); *H04N 21/234381* (2013.01); *H04N 21/25435* (2013.01); *H04N 21/25825* (2013.01)

(58) Field of Classification Search
None
See application file for complete search history.

(56) References Cited

U.S. PATENT DOCUMENTS 9,276,983 B2 * 3/2016 Rosenzweig ......... H04L 65/608
10,187,680 B2 * 1/2019 Oran ................. H04N 21/64769
10,194,188 B1 * 1/2019 Kum .................. H04L 65/4076
(Continued)

OTHER PUBLICATIONS

International Standard, "Information technology—Dynamic adaptive streaming over HTTP (DASH)—Part 1: Media presentation description and segment formats", ISO/IEC 23009-1:2019(E), Third edition, 2019-08, 236 pages.
(Continued)

*Primary Examiner* — Lashonda T Jacobs
(74) *Attorney, Agent, or Firm* — Nicholson De Vos Webster & Elliott LLP

(57) ABSTRACT

Techniques for resolution-based manifest generation for adaptive bitrate video streaming are described. As one example, a computer-implemented method includes performing a first, convex hull optimization on a video file for a first device resolution, performing a second, convex hull optimization on the video file for a second, lower device resolution, generating a first video representation for a point on both the first, convex hull optimization and the second, convex hull optimization for the first device resolution and the second, lower device resolution, generating a second video representation for a point only on the second, convex hull optimization for the second, lower device resolution, receiving a request for a manifest for the video file from a client device at the second, lower device resolution, generating the manifest for the client device that identifies the first video representation and the second video representation, and sending the manifest to the client device.

20 Claims, 10 Drawing Sheets

(51) Int. Cl.
*H04N 21/258* (2011.01)
*H04N 21/2543* (2011.01)

(56) References Cited

U.S. PATENT DOCUMENTS

| | | | | |
|---|---|---|---|---|
| 10,623,787 | B1* | 4/2020 | Nielsen | H04N 21/8456 |
| 10,652,300 | B1* | 5/2020 | Simukka | H04N 21/2668 |
| 10,659,512 | B1* | 5/2020 | Nielsen | H04L 47/10 |
| 10,742,708 | B2* | 8/2020 | Katsavounidis | H04N 19/179 |
| 10,749,925 | B1* | 8/2020 | Hudgin | H04N 21/222 |
| 10,841,356 | B2* | 11/2020 | Katsavounidis | H04N 19/132 |
| 10,841,625 | B2* | 11/2020 | Mittal | H04N 21/8456 |
| 10,848,803 | B2* | 11/2020 | Hasek | H04N 21/84 |
| 10,904,639 | B1* | 1/2021 | Benson | H04N 21/2393 |
| 10,911,791 | B2* | 2/2021 | Katsavounidis | H04N 19/152 |
| 2009/0028182 | A1* | 1/2009 | Brooks | H04L 41/0896 370/466 |
| 2014/0082661 | A1* | 3/2014 | Krahnstoever | H04N 21/234336 725/32 |
| 2014/0201324 | A1* | 7/2014 | Zhang | H04L 67/42 709/217 |
| 2016/0127440 | A1* | 5/2016 | Gordon | H04L 65/601 709/219 |
| 2016/0285939 | A1* | 9/2016 | Behbahani | H04N 21/6373 |
| 2017/0078735 | A1* | 3/2017 | Greene | H04N 21/6125 |
| 2017/0280178 | A1* | 9/2017 | Sun | H04L 65/80 |
| 2017/0353516 | A1* | 12/2017 | Gordon | H04L 67/10 |
| 2018/0063549 | A1* | 3/2018 | Amer | H04N 19/59 |
| 2018/0097772 | A1* | 4/2018 | Tirpak | H04L 61/309 |
| 2018/0242002 | A1* | 8/2018 | Katsavounidis | H04L 65/604 |
| 2018/0242015 | A1* | 8/2018 | Katsavounidis | G11B 20/00007 |
| 2019/0028745 | A1* | 1/2019 | Katsavounidis | H04N 21/23805 |
| 2020/0221141 | A1* | 7/2020 | Katsavounidis | H04N 19/152 |
| 2020/0296362 | A1* | 9/2020 | Chadwick | G06K 9/4628 |
| 2021/0021837 | A1* | 1/2021 | Mao | H04N 19/115 |
| 2021/0029416 | A1* | 1/2021 | Sachdev | H04N 21/812 |

OTHER PUBLICATIONS

Microsoft Corporation, "Smooth Streaming Protocol", [MS-SSTR]—v20180912, Sep. 12, 2018, 65 pages.

Pantos, R., "HTTP Live Streaming 2nd Edition", draft-pantos-hls-rfc8216bis-05, Informational Internet-Draft, Sep. 23, 2019, 69 pages.

* cited by examiner

| BITRATE LADDER 300 | | |
|---|---|---|
| RESOLUTION: | CORECONVEX POINT (kbps): | SUPER POINT (kbps): |
| 540p | 52 | - |
| 540p | 103 | - |
| 540p | 186 | - |
| 540p | 258 | - |
| 540p | - | 574 |
| 540p | - | 954 |
| 720p | 52 | - |
| 720p | 103 | - |
| 720p | 186 | - |
| 720p | 258 | - |
| 720p | 412 | - |
| 720p | 641 | - |
| 720p | - | 1487 |
| 1080p | 52 | - |
| 1080p | 103 | - |
| 1080p | 186 | - |
| 1080p | 258 | - |
| 1080p | 412 | - |
| 1080p | 641 | - |
| 1080p | 1024 | - |
| 1080p | 1305 | - |
| 1080p | 2090 | - |

RESOLUTION-BASED MANIFEST GENERATOR FOR ADAPTIVE BITRATE VIDEO STREAMING

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various embodiments in accordance with the present disclosure will be described with reference to the drawings, in which:

FIG. 3 is a bitrate ladder formed from the convex hull optimizations of FIG. 2 according to some embodiments.

DETAILED DESCRIPTION

Figure 1:
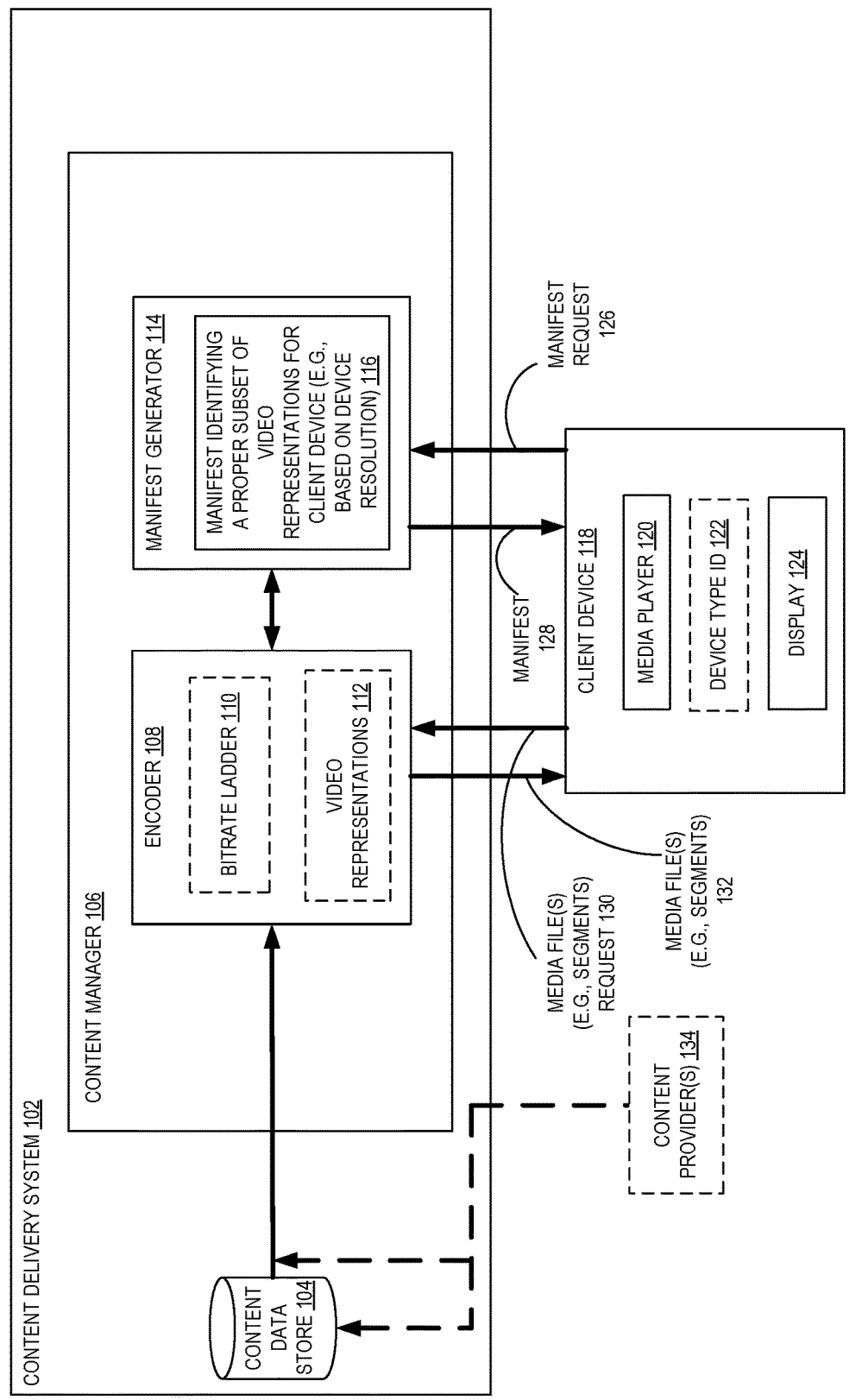
FIG. 1 is a diagram illustrating an environment including a content delivery system having a manifest generator according to some embodiments.

Various embodiments of methods, apparatuses, systems, and non-transitory computer-readable storage media for resolution-based manifest generation for adaptive bitrate video streaming are described. According to some embodiments, a content delivery system provides a plurality of different video representations for possible bitrates and/or resolutions of the same video file (e.g., a single video title), for example, to deliver high (e.g., the highest) video quality to a device of a plurality of devices with a varying set of capabilities. As one example, a client device receives a manifest (e.g., manifest file) that indicates the available video representations for the video file. Certain embodiments herein provide a resolution-based manifest that identifies an optimal set of video representations for a specific streaming device based on the device resolution. The manifest may be an adaptive bitrate (ABR) streaming manifest, such as a manifest according to a MPEG-DASH standard, a HyperText Transfer Protocol (HTTP) Live Streaming (HLS) standard, or a Smooth Streaming standard. Use of a manifest allows a client device to retain primary control over the streaming of the media in certain embodiments.

Streaming technologies may deliver one or more of a set of video representations (e.g., as identified in an ABR bitrate ladder) to a (e.g., client) device. These representations form the encoded package that is finally delivered to the device in certain embodiments. In one embodiment, the manifest identifies the set of available video representations for the device, for example, by providing a bitrate ladder (e.g., file) to the device. In one embodiment, the manifest is a Media Presentation Description (MPD) document. In one embodiment, the manifest identifies the Uniform Resource Locator (URL) or URLs to access the file(s) for the video representations.

The design of the optimal set of representations is complicated due to the large number of supported display devices, for example, each of which may have a varying set of capabilities. A device capable of a maximum display resolution (e.g., 1080p or 1920 pixels by 1080 pixels) may want to receive a (e.g., highest quality) high definition (HD) video representation (e.g., stream). However, a device capable of a greater, maximum display resolution (e.g., 4K resolution or about 3840 pixels×2160 pixels) may want to transition from a high definition (HD) stream to an ultra-high definition (UHD) stream as quickly and early as possible. These two requirements are contradictory where a single, bitrate ladder and encoded package is to deliver the best possible quality to both these devices.

Certain embodiments herein adaptively generate a manifest on the fly that is optimized to deliver the best streaming experience and desired (e.g., highest) video quality for a given device. In one embodiment, a manifest generated by the encoding discussed herein contains a superset of representations, including the highest quality streams for each device resolution (e.g., representations on the convex hull optimization for the rate-distortion curve for that device resolution). In one embodiment, when a playback request is received, a dynamic service filters out unnecessary representations from the manifest, thus enabling each device to transition to the highest quality it can support, depending on its resolution. In certain embodiments, the dynamic manifest created by this service contains the optimal, proper subset of representations for a specific streaming device.

FIG. 1 is a diagram illustrating an environment 100 including a content delivery system 102 having a manifest generator 114 according to some embodiments. The depicted content delivery system 102 includes a content data store 104, which may be implemented in one or more data centers. As one example, a media file (e.g., a video) that is to be encoded is accessed from the content data store 104 by content manager 106. In one embodiment, the encoder 108 is to encode the media file into a plurality of video representations 112 (e.g., streams). It is generally unrealistic to encode the media file into an almost boundless number of video representations. Instead, embodiments herein generate a manifest of the available video representations (e.g., stored in content delivery system 102) and form a superset manifest (e.g., which each video representation identified by bitrate ladder 110). The manifest generator 114 then uses the superset manifest to generate a manifest identifying a proper subset of video representations for a particular client device 116 (e.g., based on the client device's resolution). In certain embodiments, the content is stored in the content delivery system 102 in two parts: (i) the manifest of all available video representations (e.g., their URL addresses and, optionally, other characteristics, and (ii) the video representations (e.g., stream of segments) in a single or multiple files. In one embodiment, a client device is to read (or store) a manifest before the client device may make a request for the media from that manifest.

In certain embodiments, the generation of the superset manifest (e.g., bitrate ladder 110) occurs before receiving any request for a manifest or media file from client device 118. As an example, a superset manifest (e.g., bitrate ladder 110) is generated using (e.g., by encoder 108) a representation design model optimization. One non-limiting example of a representation design model is a convex hull optimization, e.g., such that the convex hull of a set of points in a Euclidean space is the smallest convex set that contains those points.

Figure 2:
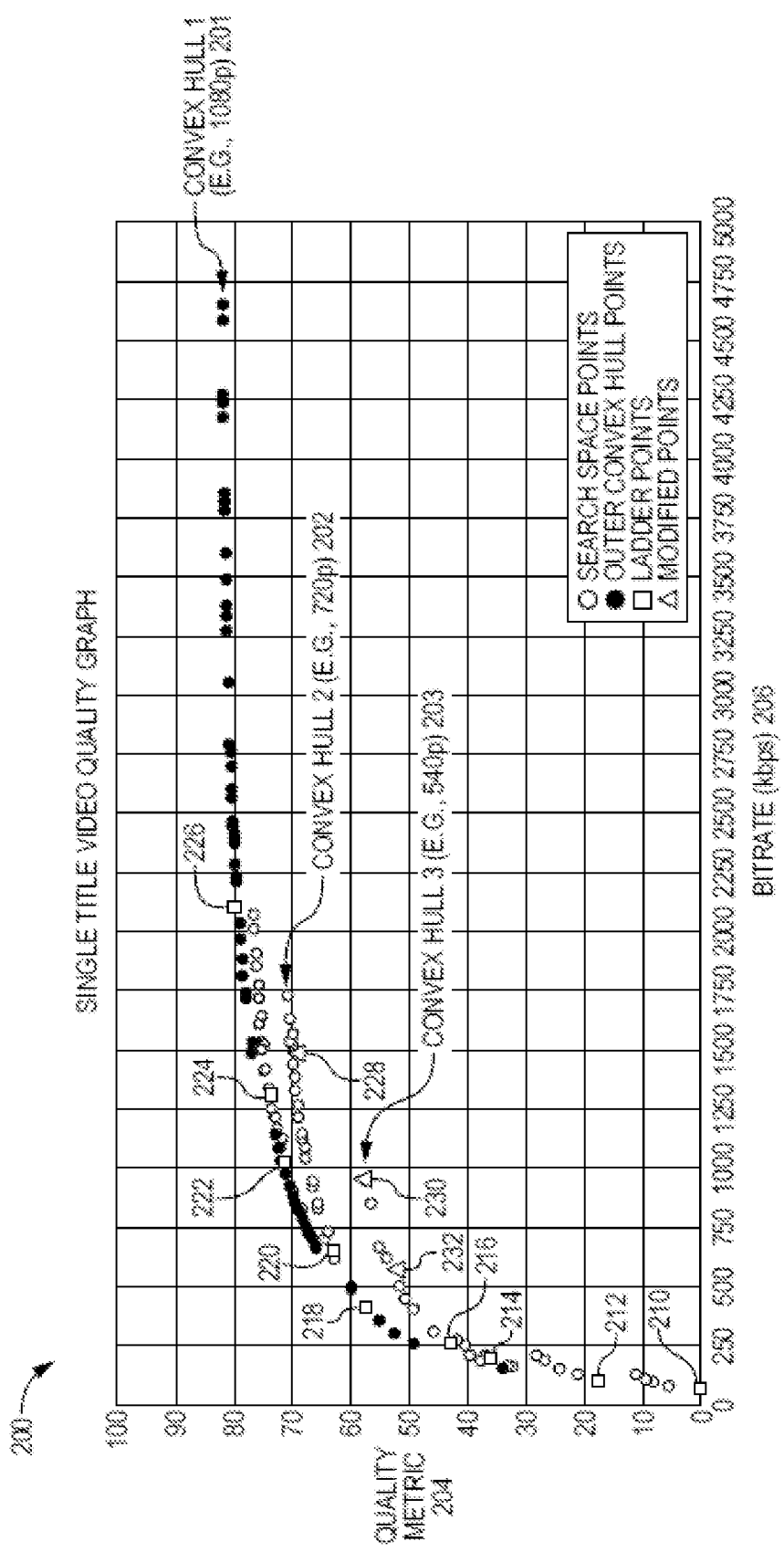
FIG. 2 is a video quality graph depicting three different convex hull optimizations on a single title according to some embodiments.

FIG. 2 is a video quality graph 200 depicting three different convex hull optimizations on a single title according to some embodiments. The depicted convex hull optimizations include a first convex hull 201 (e.g., for a device resolution up to and including a first resolution (e.g., 1080p)), a second convex hull 202 (e.g., for a device resolution up to and including a lower, second resolution (e.g., 720p)), and a third convex hull 203 (e.g., for a device resolution up to and including a third resolution (e.g., 540p) lower than the first resolution and the second resolution). The y-axis is a quality metric 204 and the x-axis is the bitrate 206 (in kbps).

Certain embodiments generate a bitrate ladder using convex optimization, e.g., optimizing with Video Multimethod Assessment Fusion (VMAF) value as the video quality metric. Using FIG. 2 as an example, for a first resolution (e.g., 1080p) source and a first resolution (e.g., 1080p) eligible device, the first convex hull 201 yields the highest video quality at any given bitrate in certain embodiments. However, there are devices and sessions that are capped to intermediate resolutions due to a variety of factors (e.g., device resolution capability, digital rights management (DRM) eligibility, resolution of the source video file, etc.). As one example, there are devices/sessions that receive a first resolution (e.g., max resolution) (e.g., 1080p) manifest, but are capped to a lower resolution (e.g., 720p or 540p) and/or there are devices that receive a lower resolution (e.g., max resolution of 540p) manifest, but are capped to an even lower resolution (e.g., 480p). Under a manifest (e.g., bitrate ladder) optimized under a convex hull for all resolutions (e.g., convex hull 201), the capped devices face a potential quality regression due to manifest truncation. For example, there are points (e.g., bitrates), such as points 228, 230, and 232, not on the first convex hull 201 that include the first resolution (e.g., 1080p) but that are on the convex hull(s) for devices with a lower maximum resolution. For example, with point 228 in FIG. 2 on convex hull 202 for a lower (e.g., 720p) resolution and points 230, 232 in FIG. 2 on convex hull 203 for an even lower (e.g., 540p) resolution. Not including such points for a device that can utilize those points (e.g., utilize the video representations for those bitrates) may cause a negative customer experience. This applies to device caps of other resolutions as well.

Certain embodiments herein enable a plurality of different types of client devices to receive a high (e.g., the highest) quality stream at a first (e.g., the highest) resolution that they are eligible to receive, allow all sources that may have a source resolution lower than a first resolution (e.g. 1080p) to also be delivered at the highest quality possible for that resolution, for all streaming sessions, to deliver the highest video quality/resolution for any given bitrate, transitioning to higher resolutions in accordance with a convex optimization process, scale to advanced ladder design technologies such as per-title encoding, where for a given bitrate, different titles may deliver different resolutions, or any combination of the above.

As opposed to a manually implemented workaround, certain embodiments herein are scalable (e.g., where resolution capped devices/sessions are far higher in number), for example, for per-title encoding where each title has a different ladder so manually workarounds will not scale since they do not follow the principle of convex optimization. Certain embodiments herein provide a consistent quality of experience to all devices, no matter what resolution they are capped at. For example, instead of focusing on convex hull optimization only for the outer convex hull 201, embodiments herein perform additional convex optimization(s) over intermediate resolutions as well (e.g., 720p, 540p, 480p, etc.). In one embodiment, a convex hull optimization for an intermediate resolution includes the supported resolutions up to and including the intermediate resolution (e.g., 720p). For example, the optimization to form convex hull 202 involves all search points up to and including the intermediate resolution (e.g., 720p) and the optimization to form convex hull 203 involves all search points up to and including the lower, intermediate resolution (e.g., 540p).

In certain embodiments, using the above set of convex hulls 201-203, the encoder 108 is to form a bitrate ladder 110 from a set of points from the convex hulls 201-203. In one embodiment, the bitrate ladder 110 identifies the points (e.g., bitrates) that video representations are to be formed from for all supported device resolutions.

FIG. 3 is a bitrate ladder 300 formed from the convex hull optimizations of FIG. 2 according to some embodiments. As shown in FIG. 3, bitrate ladder 300 has two categories for points from the convex hulls in FIG. 2: CoreConvex points and Super points (e.g., SuperXXXX points, where the "XXXX" field is to specify the maximum resolution, such as 720p, 540p, etc.).

In one embodiment, the CoreConvex points (e.g., points 210, 212, 214, 216, 218, 220, 222, 224, and 226 in FIG. 2) are the points that lie on the convex hull for all resolutions (for example, up to and including the maximum supported resolutions, e.g., 1080p). In one embodiment, the CoreConvex points below 500 kbps (that are generally $240p$, $336p$, $432p$) are CoreConvex points that are generally part of the convex hull for all resolutions. In one embodiment, the remaining CoreConvex points at 480p, 540p, and 720p are also CoreConvex points, e.g., where the 540p point lies on the convex hulls 201-203 for 540p, 720p and 1080p resolutions, and the 720p point lies on the convex hulls 202-203 for 720p and 1080p resolutions.

In certain embodiments, the Super points deliver the highest quality for each resolution and represent the highest quality bar on any device/stream capped to that resolution, e.g., the Super540p point 230 lies on the 540p convex hull 203 and delivers the highest quality at 540p resolution, and Super540p point 232 also lies on the 540p convex hull 203 and delivers the next highest quality at 540p resolution. However, in certain embodiments, the Super540p points 230 and 232 do not lie on the convex hulls 202-203 for 720p and 1080p capped resolutions. Similarly, the Super720p point 228 lies on the 540p and 720p convex hulls 202-203, respectively, but not on the 1080p convex hull 201 in certain embodiments.

Thus, the bitrate ladder 300 now consists of points belonging to the convex hulls 201-203 of three resolutions (e.g., 540p, 720p and 1080p), respectively—with each point tagged appropriately as CoreConvex or SuperXXXX. In certain embodiments, a point will only ever have one SuperXXXX tag and one CoreConvex tag associated with it, so the max number of tags that a point can have is two.

Encoder 108 may produce encoded targets corresponding to the new encoding profiles, mapped to CoreConvex and SuperXXXX points, and all these quality levels are included in the generated manifest, e.g., called the super manifest. In one embodiment, each quality level is individually tagged as CoreConvex and/or SuperXXXX, with a maximum of two tags per quality level, e.g. qualityLevelTag=CoreConvex or Super540p for a client device having a 540p device resolution.

Client device 118 includes a media player 120 (e.g., to play ABR streams) and a display 124 to show the video of the media file (e.g., video file). Client device 118 may include storage that stores a device type identification (DTID) value 122 to indicate the client device's (e.g., maximum) resolution of its display 124. Device type ID 122 may be used by content manager 106 to perform a look-up in a table that indicates device resolution for each listed device by its type ID. In another embodiment, the client device 118 is to report its resolution (e.g., as a field in manifest request 126) to content manager 106.

As one example, a client device 118 sends a manifest request 126 for a manifest of a media file (e.g., video file) of content delivery system 102. In certain embodiments, receipt of manifest request 126 causes manifest generator 114 to know the device resolution (e.g., from device type ID 122), and thus send back a manifest 128 identifying a proper subset of video representations for that particular device based on that device resolution. Additionally or alternatively, receipt of manifest request 126 causes manifest generator 114 to know (e.g., from device type ID 122) the display size (e.g., physical image size), and thus send back a manifest 128 identifying a proper subset of video representations for that particular device based on that display size (e.g., and device resolution). In certain embodiments, manifest generator 114 is to determine the device resolution (e.g., from device type ID 122), and send back a manifest 128 identifying a proper subset of video representations for that particular device based on that device resolution and on the network characteristics (e.g., network between client device 118 and content manager 106).

In one embodiment, manifest generator 114 receives the super manifest (e.g., bitrate ladder 300) which contains all CoreConvex and SuperXXXX points and provides (e.g., only) those points up to and including the device resolution. For example, with the manifest generator 114 filtering out the irrelevant quality levels. As one example from FIG. 3, for a 1080p capable device, the irrelevant quality levels are the Super540p and Super720p points in the right column, and the final manifest generated thus consists only of the CoreConvex points (for example, and any Super1080p points if the outer convex hull is for a higher resolution than 1080p, e.g., a 4K resolution). In one embodiment, if a quality level is tagged as CoreConvex as well as Super480p, Super540p, or Super720p, it is included in the final 1080p manifest. In one embodiment, for a 720p capable device 118, manifest generator 114 (e.g., separate from device 118) keeps only the CoreConvex points at 720p and below and the Super720p points, filtering out all 1080p quality levels, as well as the 540p quality levels. Note that in certain embodiments, the final manifest delivered to the device 118 is substantially smaller than the super manifest because it has only the required quality levels necessary to stream on that device, so these embodiments are not unnecessarily bloating manifest size and impacting time-to-first-frame (TTFF) and/or do not cause the client device 118 to remove any video representations that are greater than the device's resolution. These embodiments enable delivery of high quality (e.g., the highest possible quality) media for each device, regardless of the resolution cap it is subject to. Thus, certain embodiments of a manifest generator 114 are reconfigured to deliver a manifest to a given device 118 using intelligent manifest construction rather than flat manifest truncation. This is different than processing quality level name tags in a manifest and removing them selectively during delivery based on session characteristics, e.g., playback mode ("playbackMode")=Download or Streaming name tag, to remove specific quality levels based on the session type of download or streaming. The embodiments herein of resolution-based manifest construction may utilize a different variable than playback mode, for example, they may use a quality level tag ("qualityLevelTag")=CoreConvex or SuperXXXX (e.g., Super480p, Super540p, Super720p, or Super1080p, e.g., using the quality level tag when the playback mode is set to indicate streaming and not download.

In certain embodiments, after receipt of manifest 128, client device 118 (e.g., media player 120) is to send a request 130 for the media file(s) (e.g., media segment(s)) for a desired video representation. For example, a client device 118 with a resolution of 720p may request 130 the media file(s) corresponding to Super720p point 228 video representation identified in the manifest 128 (e.g., from video representations 112), and the content delivery system 102 (e.g., encoder 108) may then send the media file(s) 132 corresponding to Super720p point 228 (e.g., 1487 kilobits per second (kbps) instead of the media file(s) for CoreConvex point 220 in FIG. 2 at 641 kbps).

The embodiments herein also allow scaling to non-1080p sources (e.g., source of video file to be encoded) before encoding by encoder 108. For example, where a 720p source is encoded into CoreConvex and SuperXXXX points (e.g., 480p, Super540p, and Super720p points), ensuring the highest possible quality for that source in these embodiments. In contrast to truncating the bitrate ladder at 720p resulting in sub-optimal top 720p quality, the embodiments herein allow for creation of a custom ladder for each possible resolution cap. The embodiments herein also scale up to UHD sources, as they allow generation of a custom manifest separately for 1080p capable and UHD-capable devices.

In one embodiment, a per-title bitrate ladder design will have different starting points for each resolution, based on content characteristics, e.g., providing a systematic methodology to ensure that all titles are delivered at the highest possible quality, using a convex hull-optimized ladder, depending on device capability. The exact bitrates, and their quality level tags, may differ based on the complexity of the title, for instance, high-motion sports titles may have a Super XXXX (e.g., Super720p/Super1080p) bitrate significantly higher than other titles, indicating the need for more bits to deliver transparent quality at that resolution.

The embodiments herein may also be used to update encoding system capabilities to reduce backfill cost. Thus, providing a mechanism to handle device caps introduced by future/unknown use-cases, and helping lower risk and improve the speed and focus of compression efficiency deployments. A transcoder may be designed to trigger a full re-encode if a single bitrate level is added/modified, even if all the other quality levels are unchanged. This makes the backfill process and backfill management a very expensive process. In one embodiment, a transcoder includes the capability to trigger encoding jobs, e.g., containing a subset of required quality levels. For example, once the intermediate target for the new/modified quality level has been generated by encoding, the packaging system can use the new targets, in addition to the previously stored intermediate targets (corresponding to the existing quality levels), to create a new encrypted set of packages, ready for publishing.

Optionally, content provider(s) 134 may be included to provide a video file, for example, directly to the content manager 106 without utilizing the content data store 104 or into storage in content data store 104.

Figure 4:
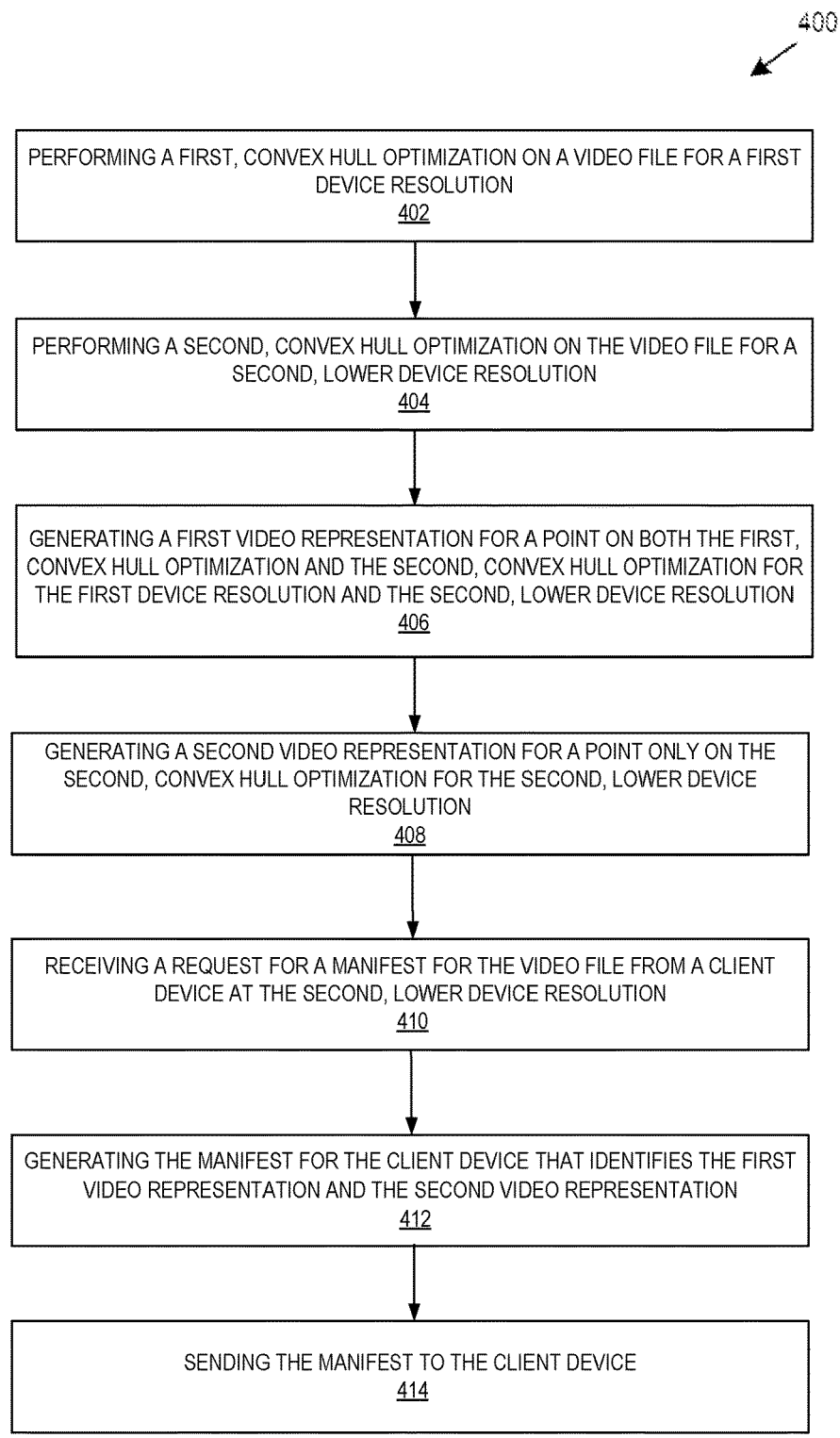
FIG. 4 is a flow diagram illustrating operations of a method for generating a manifest for a client device based on its resolution and a plurality of convex hull optimizations according to some embodiments.

FIG. 4 is a flow diagram 400 illustrating operations of a method for generating a manifest for a client device based on its resolution and a plurality of convex hull optimizations according to some embodiments. Depicted flow diagram 400 includes performing a first, convex hull optimization on a video file for a first device resolution 402, performing a second, convex hull optimization on the video file for a second, lower device resolution 404, generating a first video representation for a point on both the first, convex hull optimization and the second, convex hull optimization for the first device resolution and the second, lower device resolution 406, generating a second video representation for a point only on the second, convex hull optimization for the second, lower device resolution 408, receiving a request for a manifest for the video file from a client device at the second, lower device resolution 410, generating the manifest for the client device that identifies the first video representation and the second video representation 412, and sending the manifest to the client device 414.

Figure 5:
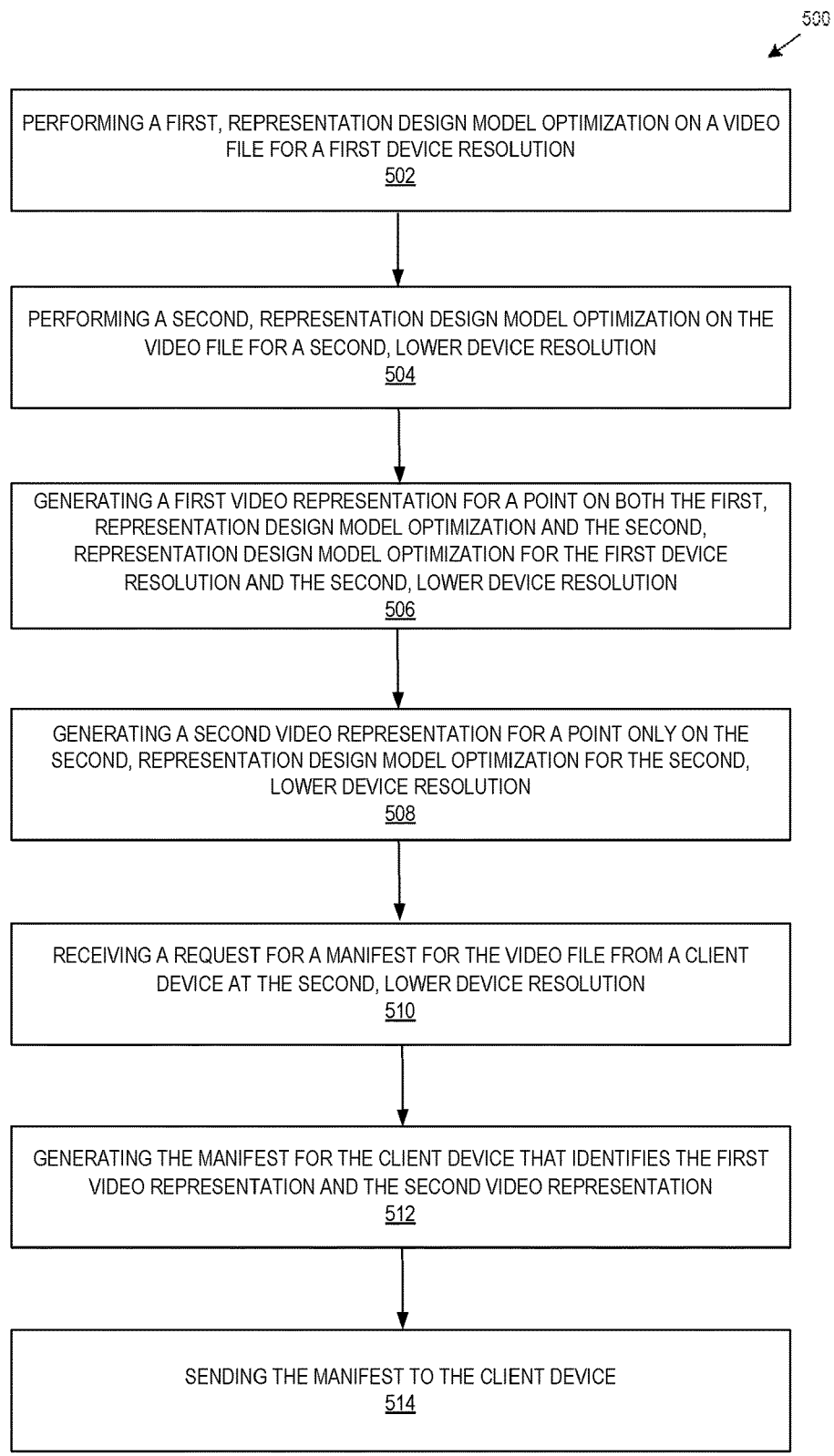
FIG. 5 is a flow diagram illustrating operations of a method for generating a manifest for a client device based on its resolution and a plurality of representation design model optimizations according to some embodiments.

FIG. 5 is a flow diagram 500 illustrating operations of a method for generating a manifest for a client device based on its resolution and a plurality of representation design model optimizations according to some embodiments. Depicted flow diagram 500 includes performing a first, representation design model optimization on a video file for a first device resolution 502, performing a second, representation design model optimization on the video file for a second, lower device resolution 504, generating a first video representation for a point on both the first, representation design model optimization and the second, representation design model optimization for the first device resolution and the second, lower device resolution 506, generating a second video representation for a point only on the second, representation design model optimization for the second, lower device resolution 508, receiving a request for a manifest for the video file from a client device at the second, lower device resolution 510, generating the manifest for the client device that identifies the first video representation and the second video representation 512, and sending the manifest to the client device 514.

Exemplary environments, systems, etc. that the above may be used in are detailed below.

At least some embodiments of the disclosed technologies can be described in view of the following examples:

Example 1. A computer-implemented method comprising:
performing a first, convex hull optimization on a video file for a first device resolution;
performing a second, convex hull optimization on the video file for a second, lower device resolution;
generating a first video representation for a point on both the first, convex hull optimization and the second, convex hull optimization for the first device resolution and the second, lower device resolution;
generating a second video representation for a point only on the second, convex hull optimization for the second, lower device resolution;
receiving a request for a manifest for the video file from a client device at the second, lower device resolution;
generating the manifest for the client device that identifies the first video representation and the second video representation; and
sending the manifest to the client device.

Example 2. The computer-implemented method of example 1, further comprising:
receiving a request for the video file from a second client device at the first device resolution;
generating a second manifest for the second client device that identifies the first video representation and not the second video representation; and
sending the second manifest to the second client device.

Example 3. The computer-implemented method of example 1, wherein the request includes a device type identification value that specifies the client device is the second, lower device resolution.

Example 4. A computer-implemented method comprising:
performing a first, representation design model optimization on a video file for a first device resolution;
performing a second, representation design model optimization on the video file for a second, lower device resolution;
generating a first video representation for a point on both the first, representation design model optimization and the second, representation design model optimization for the first device resolution and the second, lower device resolution;
generating a second video representation for a point only on the second, representation design model optimization for the second, lower device resolution;
receiving a request for a manifest for the video file from a client device at the second, lower device resolution;
generating the manifest for the client device that identifies the first video representation and the second video representation; and
sending the manifest to the client device.

Example 5. The computer-implemented method of example 4, further comprising:
receiving a request for the video file from a second client device at the first device resolution;
generating a second manifest for the second client device that identifies the first video representation and not the second video representation; and
sending the second manifest to the second client device.

Example 6. The computer-implemented method of example 4, wherein the request includes a device type identification value that specifies the client device is the second, lower device resolution.

Example 7. The computer-implemented method of example 4, wherein the manifest is an adaptive bitrate streaming manifest.

Example 8. The computer-implemented method of example 4, wherein the point on both the first, representation design model optimization and the second, representation design model optimization and the point only on the second, representation design model optimization form a single, bitrate ladder for the video file.

Example 9. The computer-implemented method of example 8, further comprising storing the single, bitrate ladder, wherein the generating the manifest comprises accessing the single, bitrate ladder.

Example 10. The computer-implemented method of example 9, wherein the storing occurs before receiving the request for the manifest from the client device.

Example 11. The computer-implemented method of example 4, further comprising:
receiving a request from the client device for the second video representation identified in the manifest; and
sending a plurality of video segments of the second video representation to the client device in response to the request from the client device for the second video representation identified in the manifest.

Example 12. The computer-implemented method of example 4, further comprising:
performing a third, representation design model optimization on the video file for a third device resolution that is lower than the first device resolution and higher than the second, lower device resolution; and
generating a third video representation for a point only on the third, representation design model optimization for the third device resolution,
wherein the first video representation represents a point on all of the first, representation design model optimization, the second, representation design model optimization, and the third, representation design model optimization for the first device resolution, the second, lower device resolution, and the third device resolution.

Example 13. The computer-implemented method of example 12, wherein the manifest for the client device at the third device resolution identifies the first video representation, the third video representation, and not the second video representation.

Example 14. The computer-implemented method of example 12, further comprising:
receiving a request for the video file from a second client device at the first device resolution;
generating a second manifest for the second client device that identifies the first video representation, and not the second video representation or the third video representation; and
sending the second manifest to the second client device.

Example 15. A system comprising:
a content data store to store a video file; and
a content manager service implemented by a first one or more electronic devices, the content manager service including instructions that upon execution cause the first one or more electronic devices to:
perform a first, representation design model optimization on the video file from the content data store for a first device resolution,
perform a second, representation design model optimization on the video file for a second, lower device resolution,
generate a first video representation for a point on both the first, representation design model optimization and the second, representation design model optimization for the first device resolution and the second, lower device resolution,
generate a second video representation for a point only on the second, representation design model optimization for the second, lower device resolution,
receive a request for a manifest for the video file from a client device at the second, lower device resolution,
generate the manifest for the client device that identifies the first video representation and the second video representation, and
send the manifest to the client device.

Example 16. The system of example 15, wherein the content manager service further includes instructions that upon execution cause the first one or more electronic devices to:
receive a request for the video file from a second client device at the first device resolution;
generate a second manifest for the second client device that identifies the first video representation and not the second video representation; and
send the second manifest to the second client device.

Example 17. The system of example 15, wherein the request includes a device type identification value that specifies the client device is the second, lower device resolution.

Example 18. The system of example 15, wherein the manifest is an adaptive bitrate streaming manifest.

Example 19. The system of example 15, wherein the content manager service further includes instructions that upon execution cause the first one or more electronic devices to:
receive a request from the client device for the second video representation identified in the manifest; and
send a plurality of video segments of the second video representation to the client device in response to the request from the client device for the second video representation identified in the manifest.

Example 20. The system of example 15, wherein the content manager service further includes instructions that upon execution cause the first one or more electronic devices to:
perform a third, representation design model optimization on the video file for a third device resolution that is lower than the first device resolution and higher than the second, lower device resolution; and
generate a third video representation for a point only on the third, representation design model optimization for the third device resolution,
wherein the first video representation represents a point on all of the first, representation design model optimization, the second, representation design model optimization, and the third, representation design model optimization for the first device resolution, the second, lower device resolution, and the third device resolution.

Figure 6:
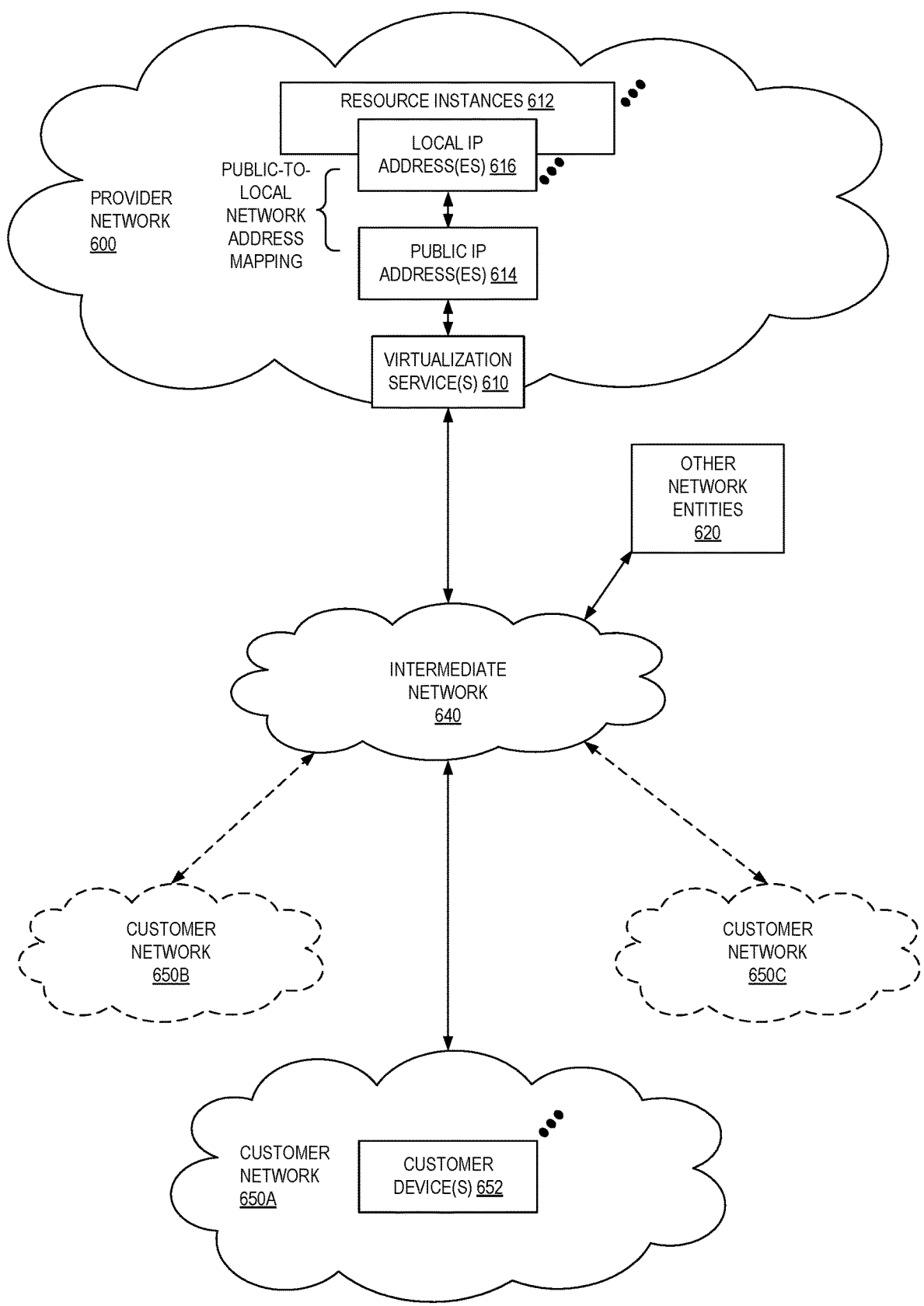
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider network 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
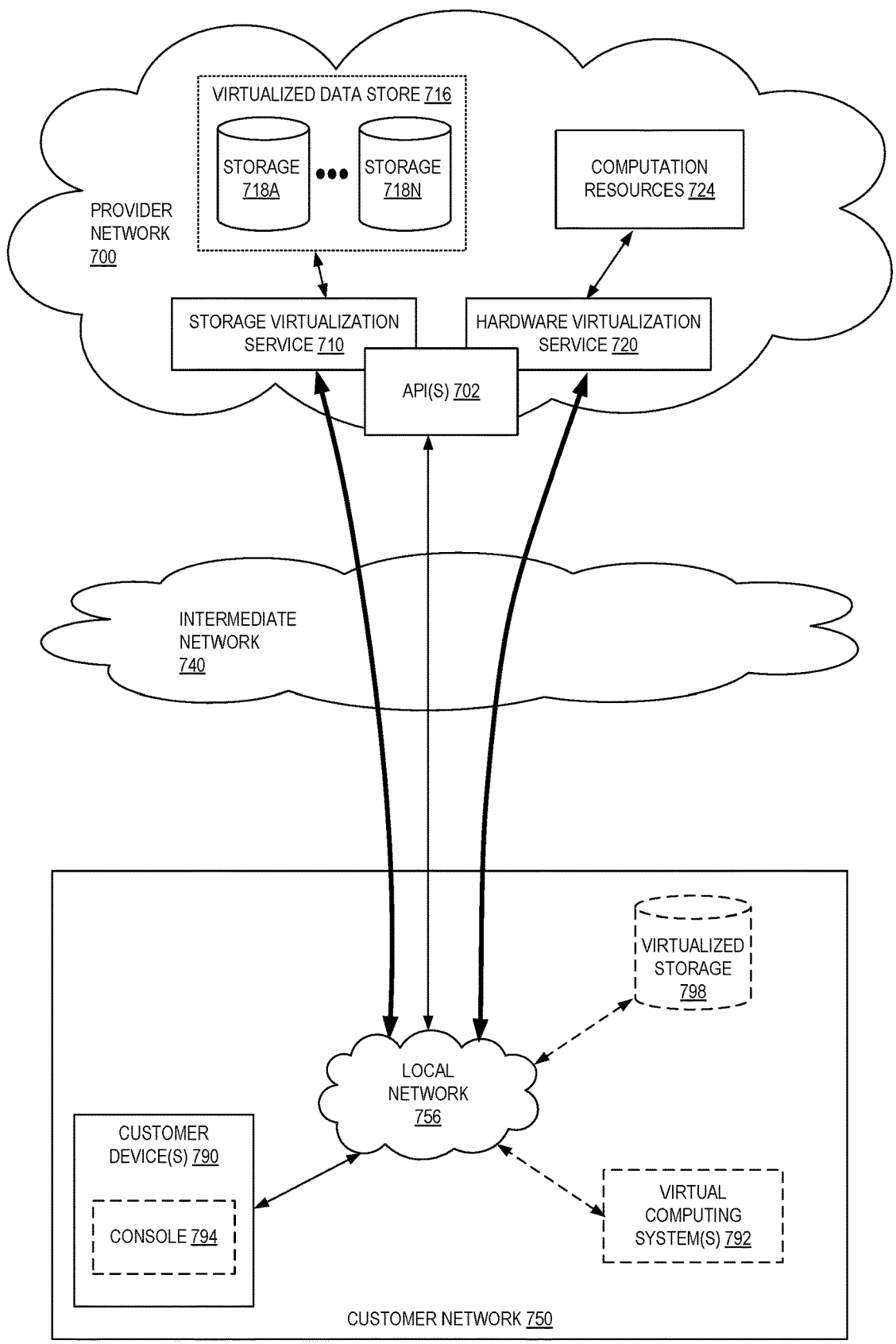
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative System

Figure 8:
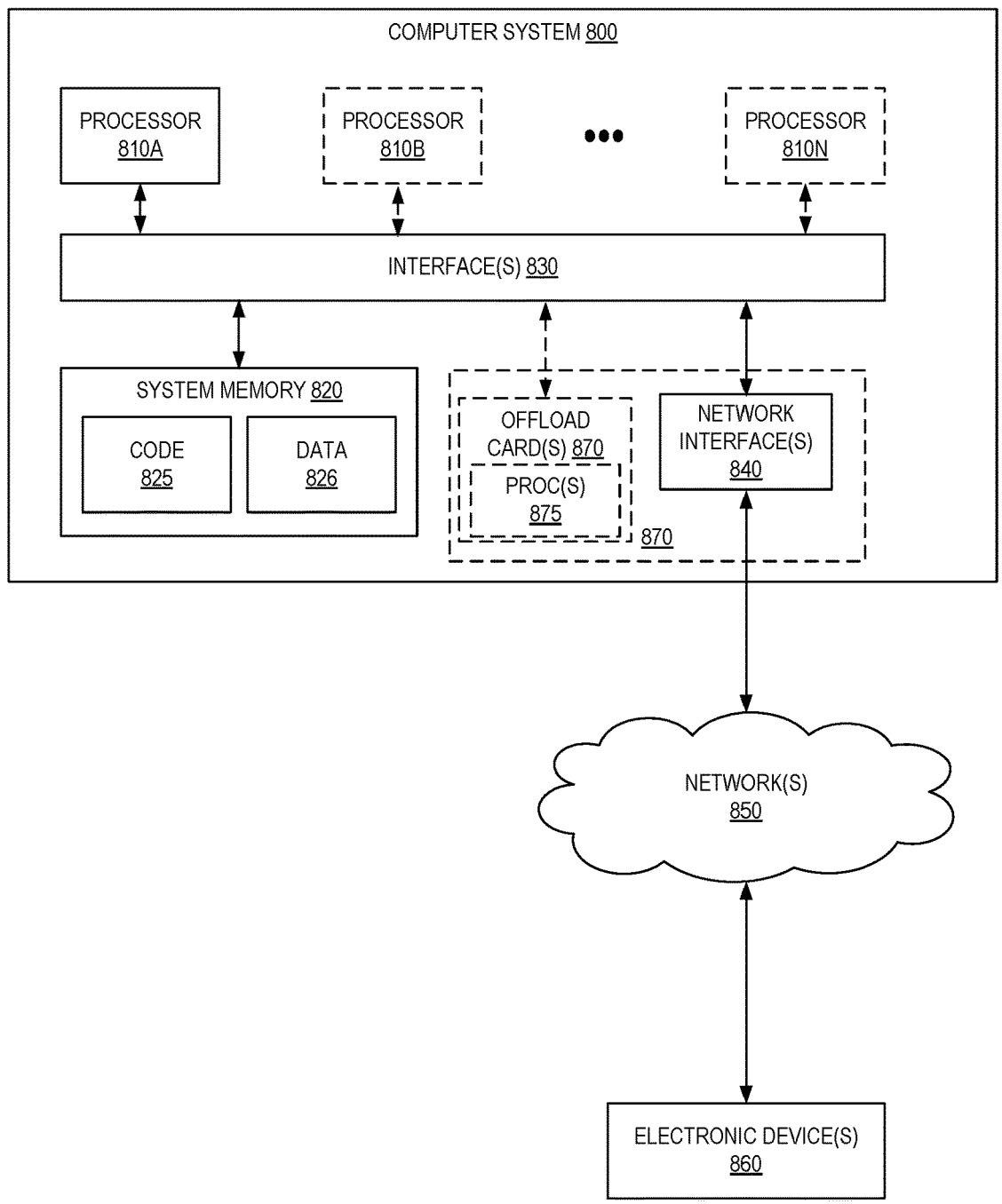
FIG. 8 is a block diagram illustrating an example computer system that may be used in some embodiments.

In some embodiments, a system that implements a portion or all of the techniques for content indexing as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Figure 9:
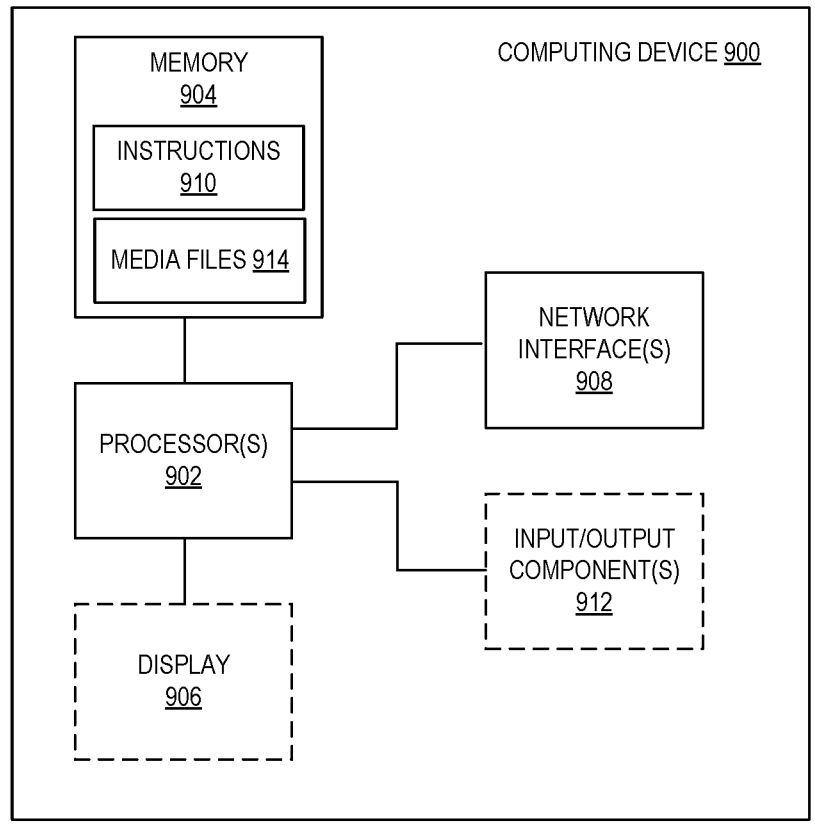
FIG. 9 illustrates a logical arrangement of a set of general components of an exemplary computing device that can be utilized in accordance with various embodiments.

FIG. 9 illustrates a logical arrangement of a set of general components of an example computing device 900. Generally, a computing device 900 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 902 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 904) to store code (for example, instructions 910, e.g., which implement an anomaly detector as disclosed herein) and/or media files 914 (e.g., generated by encoder 108 in FIG. 1), and a set of one or more wired or wireless network interfaces 908 allowing the electronic device to transmit data to and receive data from other computing devices, typically across one or more networks (e.g., Local Area Networks (LANs), the Internet). For example, where computing device 900 is an instance of client device 118 in FIG. 1, e.g., and is coupled via network interface(s) 908 to content delivery system 102 in FIG. 1. The coupling of the set of processors and other components is typically through one or more interconnects within the electronic device, (e.g., busses and possibly bridges). Thus, the non-transitory machine-readable storage media (e.g., memory 904) of a given electronic device typically stores code (e.g., instructions 910) for execution on the set of one or more processors 902 of that electronic device. One or more parts of various embodiments may be implemented using different combinations of software, firmware, and/or hardware.

A computing device 900 can include some type of display element 906, such as a touch screen or liquid crystal display (LCD), although many devices such as portable media players might convey information via other means, such as through audio speakers, and other types of devices such as server end stations may not have a display element 906 at all. As discussed, some computing devices used in some embodiments include at least one input and/or output component(s) 912 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 10:
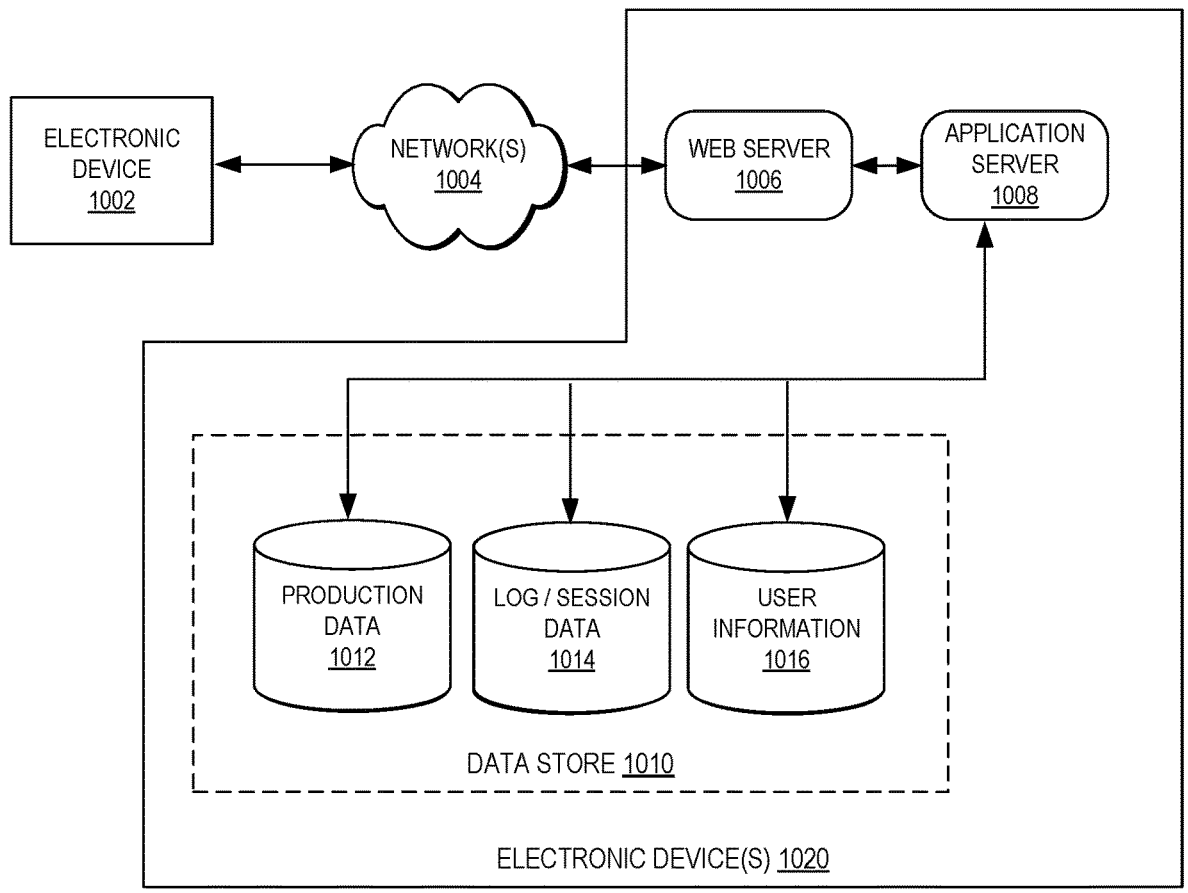
FIG. 10 illustrates an example of an environment for implementing aspects in accordance with various embodiments.

As discussed, different approaches can be implemented in various environments in accordance with the described embodiments. For example, FIG. 10 illustrates an example of an environment 1000 for implementing aspects in accordance with various embodiments. For example, in some embodiments messages are HyperText Transfer Protocol (HTTP) requests that are received by a web server (e.g., web server 1006), and the users, via electronic devices, may interact with the provider network via a web portal provided via the web server 1006 and application server 1008. As will be appreciated, although a web-based environment is used for purposes of explanation, different environments may be used, as appropriate, to implement various embodiments. The system includes an electronic client device 1002, which may also be referred to as a client device and can be any appropriate device operable to send and receive requests, messages or information over an appropriate network 1004 and convey information back to a user of the device 1002. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1004 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1004 includes the Internet, as the environment includes a web server 1006 for receiving requests and serving content in response thereto, although for other networks an alternative device serving a similar purpose could be used, as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device 1002 and handling a majority of the data access and business logic for an application. The application server 1008 provides access control services in cooperation with the data store 1010 and is able to generate content such as text, graphics, audio, video, etc., to be transferred to the client device 1002, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1002 and the application server 1008, can be handled by the web server 1006. It should be understood that the web server 1006 and application server 1008 are not required and are merely example components, as structured code discussed herein can be executed on any appropriate device or host machine as discussed elsewhere herein.

The data store 1010 can include several separate data tables, databases, or other data storage mechanisms and media for storing data relating to a particular aspect. For example, the data store illustrated includes mechanisms for storing production data 1012 and user information 1016, which can be used to serve content for the production side. The data store 1010 also is shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. In one example, a user might submit a search request for a certain type of item. In this case, the data store 1010 might access the user information 1016 to verify the identity of the user and can access a production data 1012 to obtain information about items of that type. The information can then be returned to the user, such as in a listing of results on a web page that the user is able to view via a browser on the user device 1002. Information for a particular item of interest can be viewed in a dedicated page or window of the browser.

The web server 1006, application server 1008, and/or data store 1010 may be implemented by one or more electronic devices 1020, which can also be referred to as electronic server devices or server end stations, and may or may not be located in different geographic locations. Each of the one or more electronic devices 1020 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the environment 1000 in FIG. 10 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    performing a first, convex hull optimization on a video file for a first device resolution;
    performing a second, convex hull optimization on the video file for a second, lower device resolution;
    generating a first video representation for a point on both the first, convex hull optimization and the second, convex hull optimization for the first device resolution and the second, lower device resolution;
    generating a second video representation for a point only on the second, convex hull optimization for the second, lower device resolution;
    receiving a request for a manifest for the video file from a client device at the second, lower device resolution;
    generating the manifest for the client device that identifies the first video representation and the second video representation; and
    sending the manifest to the client device.

2. The computer-implemented method of claim 1, further comprising:
    receiving a request for the video file from a second client device at the first device resolution;
    generating a second manifest for the second client device that identifies the first video representation and not the second video representation; and
    sending the second manifest to the second client device.

3. The computer-implemented method of claim 1, wherein the request includes a device type identification value that specifies the client device is the second, lower device resolution.

4. A computer-implemented method comprising:
    performing a first, representation design model optimization on a video file for a first device resolution;
    performing a second, representation design model optimization on the video file for a second, lower device resolution;
    generating a first video representation for a point on both the first, representation design model optimization and the second, representation design model optimization for the first device resolution and the second, lower device resolution;
    generating a second video representation for a point only on the second, representation design model optimization for the second, lower device resolution;
    receiving a request for a manifest for the video file from a client device at the second, lower device resolution;
    generating the manifest for the client device that identifies the first video representation and the second video representation; and
    sending the manifest to the client device.

5. The computer-implemented method of claim 4, further comprising:
    receiving a request for the video file from a second client device at the first device resolution;
    generating a second manifest for the second client device that identifies the first video representation and not the second video representation; and
    sending the second manifest to the second client device.

6. The computer-implemented method of claim 4, wherein the request includes a device type identification value that specifies the client device is the second, lower device resolution.

7. The computer-implemented method of claim 4, wherein the manifest is an adaptive bitrate streaming manifest.

8. The computer-implemented method of claim 4, wherein the point on both the first, representation design model optimization and the second, representation design model optimization and the point only on the second, representation design model optimization form a single, bitrate ladder for the video file.

9. The computer-implemented method of claim 8, further comprising storing the single, bitrate ladder, wherein the generating the manifest comprises accessing the single, bitrate ladder.

10. The computer-implemented method of claim 9, wherein the storing occurs before receiving the request for the manifest from the client device.

11. The computer-implemented method of claim 4, further comprising:
receiving a request from the client device for the second video representation identified in the manifest; and
sending a plurality of video segments of the second video representation to the client device in response to the request from the client device for the second video representation identified in the manifest.

12. The computer-implemented method of claim 4, further comprising:
performing a third, representation design model optimization on the video file for a third device resolution that is lower than the first device resolution and higher than the second, lower device resolution; and
generating a third video representation for a point only on the third, representation design model optimization for the third device resolution,
wherein the first video representation represents a point on all of the first, representation design model optimization, the second, representation design model optimization, and the third, representation design model optimization for the first device resolution, the second, lower device resolution, and the third device resolution.

13. The computer-implemented method of claim 12, wherein the manifest for the client device at the third device resolution identifies the first video representation, the third video representation, and not the second video representation.

14. The computer-implemented method of claim 12, further comprising:
receiving a request for the video file from a second client device at the first device resolution;
generating a second manifest for the second client device that identifies the first video representation, and not the second video representation or the third video representation; and
sending the second manifest to the second client device.

15. A system comprising:
a content data store to store a video file; and
a content manager service implemented by a first one or more electronic devices, the content manager service including instructions that upon execution cause the first one or more electronic devices to:
perform a first, representation design model optimization on the video file from the content data store for a first device resolution,
perform a second, representation design model optimization on the video file for a second, lower device resolution,
generate a first video representation for a point on both the first, representation design model optimization and the second, representation design model optimization for the first device resolution and the second, lower device resolution,
generate a second video representation for a point only on the second, representation design model optimization for the second, lower device resolution,
receive a request for a manifest for the video file from a client device at the second, lower device resolution,
generate the manifest for the client device that identifies the first video representation and the second video representation, and
send the manifest to the client device.

16. The system of claim 15, wherein the content manager service further includes instructions that upon execution cause the first one or more electronic devices to:
receive a request for the video file from a second client device at the first device resolution;
generate a second manifest for the second client device that identifies the first video representation and not the second video representation; and
send the second manifest to the second client device.

17. The system of claim 15, wherein the request includes a device type identification value that specifies the client device is the second, lower device resolution.

18. The system of claim 15, wherein the manifest is an adaptive bitrate streaming manifest.

19. The system of claim 15, wherein the content manager service further includes instructions that upon execution cause the first one or more electronic devices to:
receive a request from the client device for the second video representation identified in the manifest; and
send a plurality of video segments of the second video representation to the client device in response to the request from the client device for the second video representation identified in the manifest.

20. The system of claim 15, wherein the content manager service further includes instructions that upon execution cause the first one or more electronic devices to:
perform a third, representation design model optimization on the video file for a third device resolution that is lower than the first device resolution and higher than the second, lower device resolution; and
generate a third video representation for a point only on the third, representation design model optimization for the third device resolution,
wherein the first video representation represents a point on all of the first, representation design model optimization, the second, representation design model optimization, and the third, representation design model optimization for the first device resolution, the second, lower device resolution, and the third device resolution.

* * * * *